UNITED STATES PATENT OFFICE.

JAMES ROBERT MOORE AND CHARLES SMITH BOYNTON, OF BURLINGTON, VERMONT, ASSIGNORS TO THE MALTED CEREALS COMPANY, OF SAME PLACE.

PROCESS OF MAKING MALTED FLOUR.

SPECIFICATION forming part of Letters Patent No. 678,749, dated July 16, 1901.

Application filed October 9, 1900. Serial No. 32,551. (No specimens.)

*To all whom it may concern:*

Be it known that we, JAMES ROBERT MOORE and CHARLES SMITH BOYNTON, citizens of the United States, residing at Burlington, in the county of Chittenden and State of Vermont, have invented certain new and useful Improvements in Processes of Making Malted Flour; and we do hereby declare the following to be a full, clear, and exact description of the invention, such as will enable others skilled in the art to which it appertains to make and use the same.

Our invention relates to the process of making malted flour, as hereinafter described and claimed.

In the carrying out of our process we take wheat and reduce it to flour in the ordinary way, dividing said flour into two parts. We then take the second portion of flour thus produced and mix it with approximately one-fifth of its weight of powdered malt, preferably barley-malt. To this mixture water is added sufficient in quantity to form a thin paste. This paste is then heated for several hours at a temperature varying from 140° to 160° Fahrenheit, and during this heating operation the paste is agitated. After this additional flour is added in small quantities from time to time to the mixture, which is constantly stirred during such addition to allow the digestive action of the malt to take place upon all the starch of the flour added until a stiff paste or dough is produced. The starch of the wheat is thus transformed into maltose and malto-dextrin by the action of the diastase of the malt, which gives to the compound the distinctive flavor and quality of the malt-food products. This dough is then baked in the usual manner and at the usual temperature. The baked product is then reduced to flour and mixed with about six times its weight of the first flour already referred to.

It is obvious that instead of reducing the wheat to a fine flour or powder it may be subjected to a grinding action, which will reduce it to small grains or granules, and that the malt mixed therewith may also be reduced to grains or granules, so that the final product is in a granular state rather than in a powdery condition. It is also obvious that the time of heating the paste and that the temperature to which it is subjected may be varied without departing from the spirit of our invention. It is also obvious that the relative proportions of malt-flour and wheat or other flour or meal used in the first part of our process may be varied within wide limits, and the same is true of the relative proportions of the granulated or powdered bread and the high-grade flour or meal. Our process, moreover, is not only applicable to wheat, but also to barley, corn, and, in fact, all kinds of cereals. The final product—malted flour or granules—can be used in the ordinary way in the preparation of breakfast food, bread, biscuits, pastry, and the like, by means of which said food products are rendered more easily digestible and more nourishing than those derived from ordinary flour.

Having thus described our invention, what we claim, and desire to secure by Letters Patent, is—

1. The process of making malted flour, which consists in mixing flour with a comparatively small percentage of malt-flour, moistening said mixture, heating and agitating the said mixture, adding additional flour to said mixture to form a dough, baking said dough, pulverizing said baked product, and mixing said pulverized product with a large percentage of a pulverized cereal.

2. The process of making malted flour, which consists in mixing flour with about one-fifth of its weight of pulverized malt, adding sufficient water to said mixture to form a thin paste, heating and agitating said moistened mixture, mixing therewith from time to time small quantities of flour until a stiff paste or dough is produced, baking said dough, pulverizing the product thus obtained and mixing said pulverized product with about six times its weight of a pulverized cereal.

3. The process of making malted flour, which consists in reducing wheat to flour, dividing said flour into two portions, mixing the second portion with about one-fifth of its weight of malted flour, adding sufficient water to said mixture to form a thin paste, heating and agitating said moistened mixture for several hours at a temperature varying from 140° to 160° Fahrenheit, stirring into said mixture from time to time small quantities of flour until a stiff paste or dough is produced, baking said dough, powdering the baked product thus produced, and mixing said powdered product with about six times its weight of flour.

In testimony whereof we affix our signatures in presence of two witnesses.

JAMES ROBERT MOORE.
CHARLES SMITH BOYNTON.

Witnesses:
GEORGE M. BESETT,
DON A. MANSON.